July 26, 1932. O. W. DUNHAM 1,868,817
PITMAN BEARING ASSEMBLY
Filed Nov. 26, 1928    3 Sheets-Sheet 3
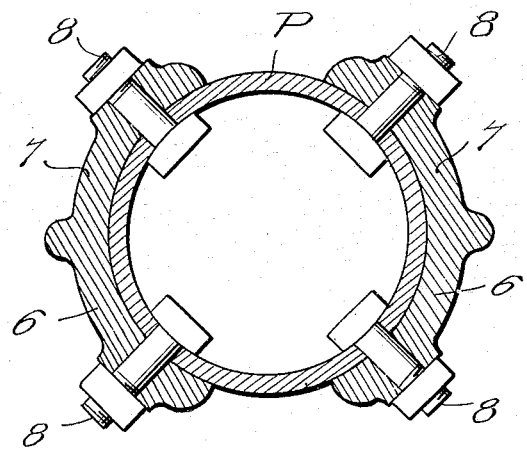
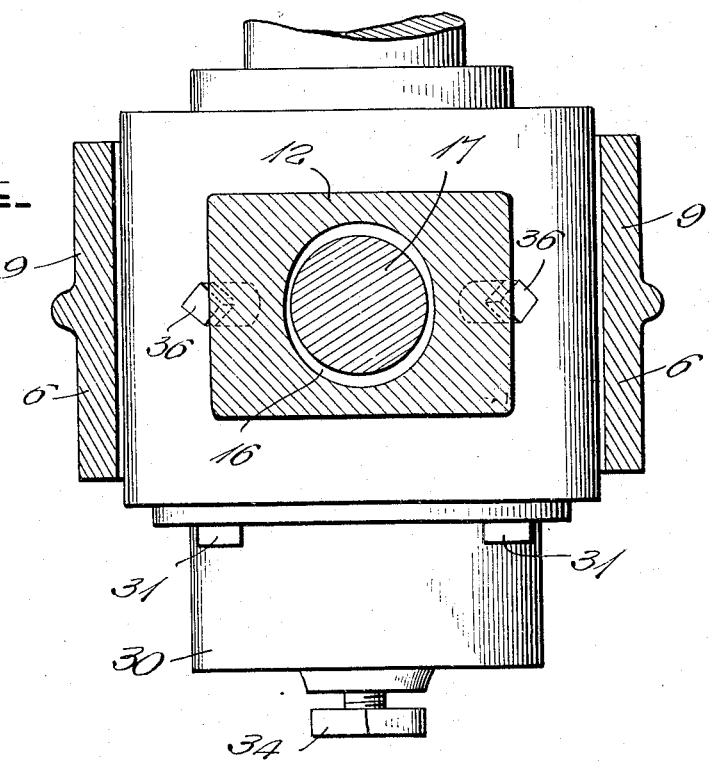
Inventor
Orson W. Dunham,
Attorneys Patented July 26, 1932

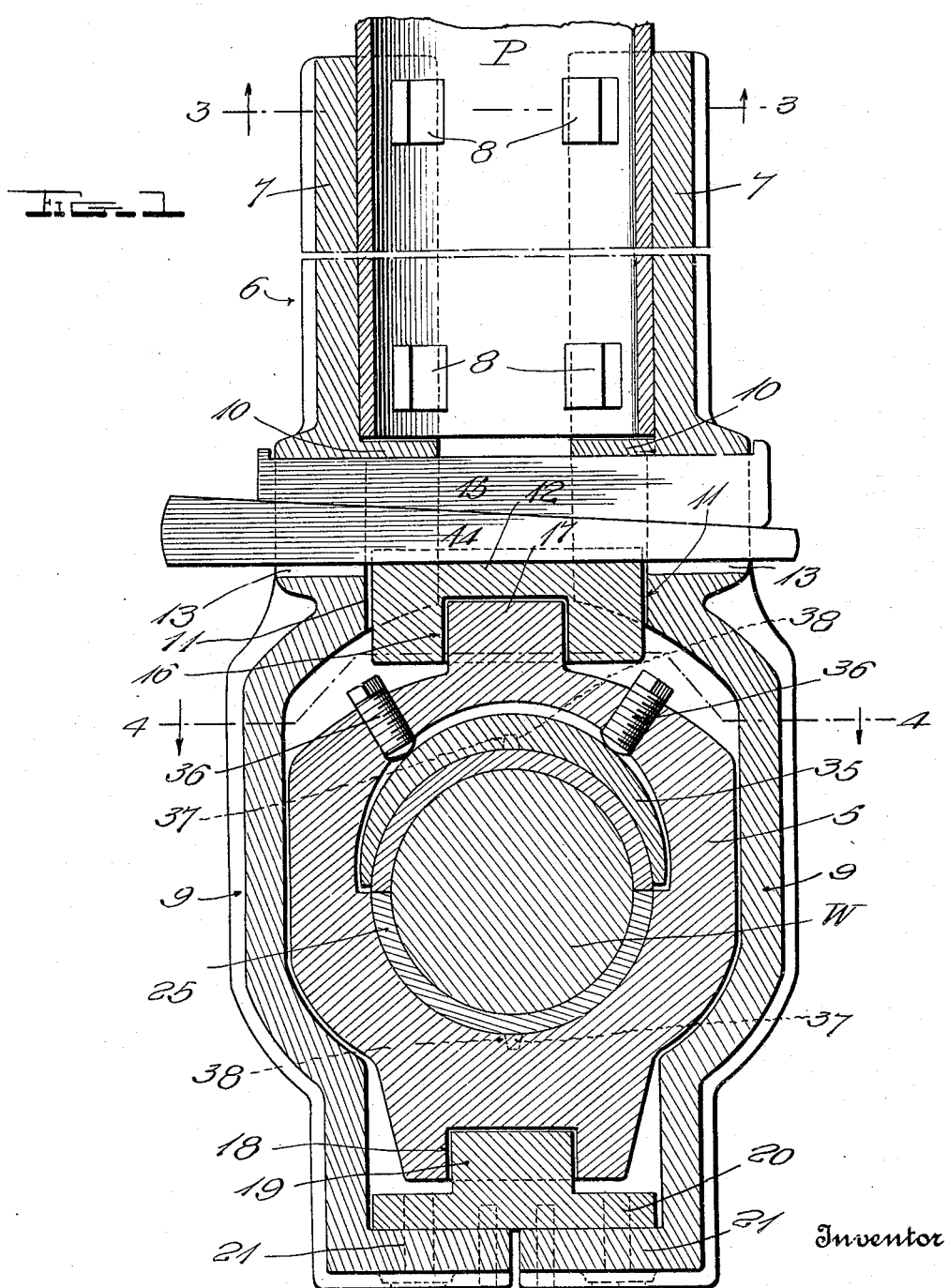

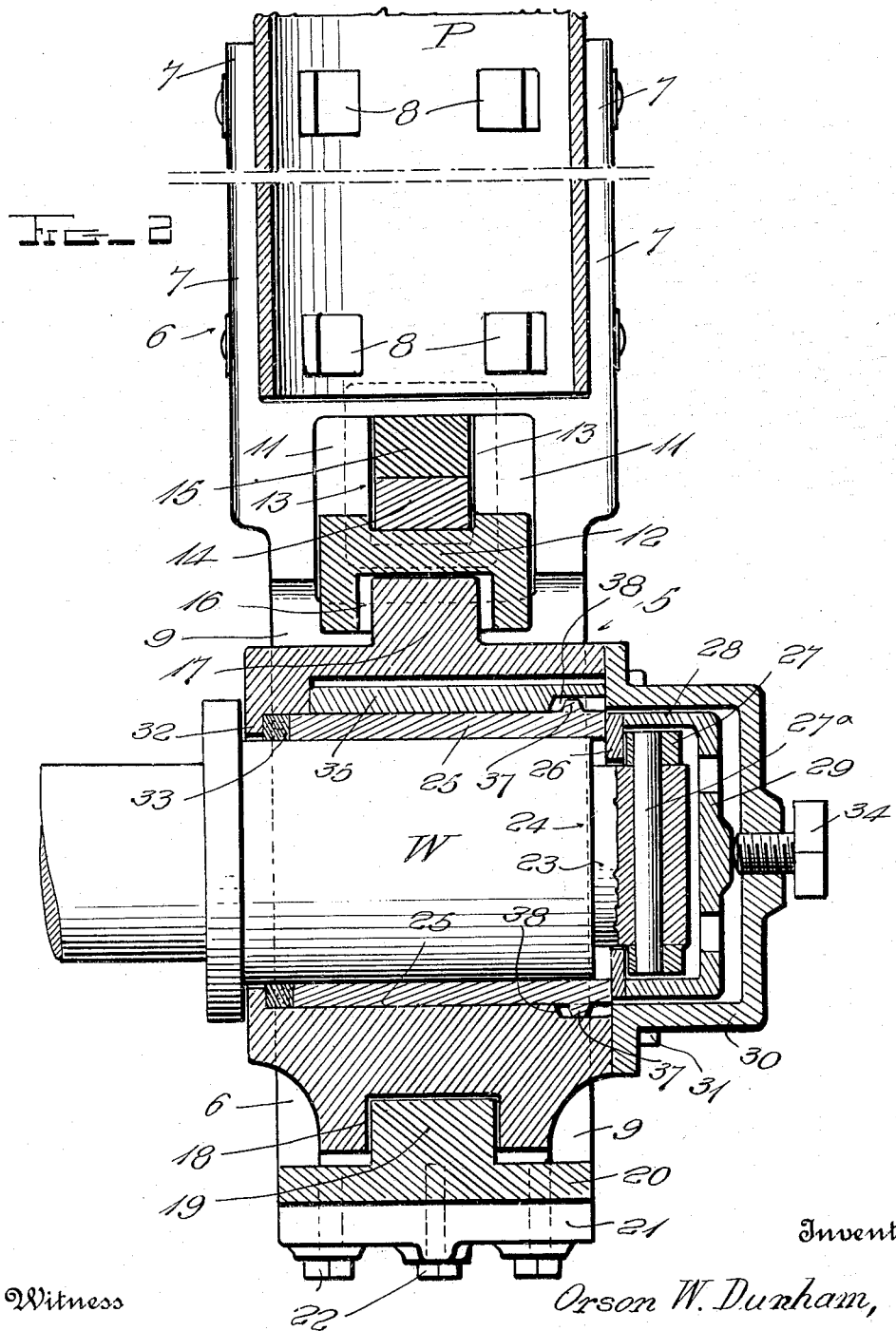

1,868,817

UNITED STATES PATENT OFFICE

ORSON W. DUNHAM, OF WEBB CITY, MISSOURI, ASSIGNOR TO WERTZBERGER DERRICK COMPANY

PITMAN BEARING ASSEMBLY

Application filed November 26, 1928. Serial No. 322,018.

The invention relates to pitman bearings designed primarily for use with walking beam pumps. On account of the extremely heavy lift handled with such pumps, the load invariably so affects the pitman jack as to cause untrue operation of the pitman, and it is one object of my invention to provide a unique connection between the bearing for the wrist pin and the pitman which will permit any necessary relative movements between the two necessitated by such untrue action of the pitman.

It is a further object of the invention to provide new and improved stirrup or yoke construction for connecting the wrist pin bearing with the pitman, the construction herein disclosed being designed for use with a pitman formed from a length of heavy pipe.

A still further object is to provide novel means whereby the stirrup or yoke may be quickly and easily disconnected from the wrist pin bearing whenever the use to which the mechanism is to be put, requires such disconnection.

Yet another aim is to make novel provision whereby the wrist pin bearing is held against sliding from the wrist pin and said bearing is tightly packed against escape of oil and entrance of sand and the like.

With the foregoing in view, the invention resides in the novel subject matter hereinafter described and claimed, description being accomplished by reference to the accompanying drawings.

Fig. 1 is a vertical sectional view through an assembly constructed in accordance with my invention, cut in a plane transverse to the wrist pin.

Fig. 2 is another vertical sectional view cut in a plane at right angles to Fig. 1.

Figs. 3 and 4 are horizontal sectional views on the correspondingly numbered lines of Fig. 1, looking in the directions indicated by the arrows.

The drawings above briefly described illustrate the preferred form of construction and while this construction will be herein specifically explained, it is to be understood that within the scope of the invention as claimed, variations may be made. Furthermore, while such relative terms as "upper" and "lower" may be herein used for descriptive purposes, it is to be understood that the bearing is not restricted to use in any particular position.

P denotes the pitman formed from a length of heavy pipe and W denotes the conventional wrist pin, changed somewhat however as hereinafter described. A bearing body 5 is mounted upon the wrist pin W in a manner hereinafter described, and a stirrup or yoke 6 receives this bearing, said stirrup or yoke being in the present disclosure provided with arms 7 projecting outwardly from its inner end and of curved form in transverse section to be secured by bolts or the like 8 against opposite sides of the pitman P.

The stirrup or yoke 6 is formed of two longitudinal sections 9 provided at one end with the arms 7. The inner opposed portions 10 of these yoke sections at the inner ends of said arms, are formed with opposed rectangular recesses 11 which receive the ends of a block 12 in such manner that this block may move toward or from the opposite end of the yoke. The portions 10 of the sections 9 are also formed with openings 13 which receive a wedge 14 and a backing 15 therefor. The inner side of this block is formed with a socket 16 which is preferably of substantially elliptical form as seen more particularly in Figs. 2 and 4. This socket receives a cylindrical pivot stud 17 on the bearing body 5 and at a diametrically opposite location, this bearing body is formed with a circular socket 18. This socket 18 receives a cylindrical pivot stud 19 on a rectangular plate 20. The ends 21 of the yoke sections 9, remote from the arms 7, are directed inwardly toward each other and the block 20 is secured against the inner sides of these ends, by cap screws or the like 22. Block 20 and the screws 22 hence serve as connecting means for these ends of the yoke sections and at the same time as anchoring means for the pivot stud 19.

The studs 17—19 and their receiving sockets 16—18, permit relative turning of the pitman P and the bearing body 5 about an axis extending longitudinally of the former.

Then, too, the substantially elliptical form of the socket 16 and the looseness of the stud 19 in the socket 18, permit slight relative swinging of the pitman P and the bearing body 5 in a plane extending longitudinally of both said pitman and body. By thus permitting relative movement in two directions, it is insured that there shall be no binding of parts regardless of any untrue operation thereof.

It is often necessary to disconnect the pitman from the wrist pin and when this must be done, the bearing body 5 remains upon said pin. In the present instance, the pivot means between this body and the yoke 6 are released, and this yoke and the pitman are swung to move the former from said bearing body. To release the pivot means, the wedge 14 and its backing 15 are removed, permitting sliding of the block 12 toward the pitman P, in the recesses 11. This movement of the block permits disengagement of the studs 17—19 from the sockets 16—18 and allows the yoke 6 to move endwise from the bearing body. The parts may again be connected with each other when desired, with equal ease and rapidity.

The wrist pin W is reduced at its outer end as shown at 23, providing it with an outwardly facing shoulder 24. A bushing sleeve 25 preferably formed of two sections, surrounds the pin W and projects slightly beyond the shoulder 24. A thrust ring 26 abuts this projecting end of the sleeve 25 and surrounds the reduced end 23 of the wrist pin. Secured upon this reduced pin end and disposed at the outer side of the thrust ring 26, is a collar 27, a pin 27ª being preferably passed through said collar and pin end to anchor the former. This collar is of less external diameter than the thrust ring 26 and the side wall 28 of a thrust cap 29, bears against the portion of said thrust ring beyond the periphery of said collar 27, said cap extending over this collar and the outer end of the wrist pin as clearly shown in Fig. 2. The parts 25—26—27—28—29 are all disposed in the bearing body 5 and the latter embodies a cap 30 closing its outer end and secured in place by cap screws or the like 31. The inner end of this bearing body is provided with a shoulder 32 which is opposed to the inner end of the sleeve 25, and a packing ring 33 is interposed between said shoulder sleeve. A thrust screw 34 is threaded through the cap 30 and bears against the cap 29, so that upon tightening of this screw, the parts 29—28—26—25 will all be forced inwardly, thereby compressing the packing ring 33 into tight contact with the wrist pin W, so that oil from the bearing cannot leak out and sand and the like cannot enter to cause excessive wear. The thrust ring 26 is tightly held in place between the wall 28 of the cap 29 and the sleeve 25, and as this ring abuts the inner edge of the collar 27, these two parts serve to prevent endwise shifting of the entire bearing from the wrist pin.

I have above stated that the sleeve 25 is preferably formed of two sections. This construction is shown most clearly in Fig. 1 and is for the purpose of compensating for wear. One section of this sleeve contacts solidly with the interior of the body 5 while the other section of said sleeve abuts an arcuate backing 35 which may be forced inwardly to the required extent by set screws 36, and by this construction, it is possible to compensate for wear. To prevent rotation of the sleeve 25, its sections are provided with lugs 37 received in grooves 38, one of these grooves being in the backing 35 and the other in the solid wall of the bearing body 5.

From the foregoing taken in connection with the accompanying drawings, it will be seen that while the invention is rather simple and inexpensive, it will be highly efficient and desirable for permitting relative movements of wrist pin and pitman as occasion may demand, for permitting quick and easy disconnection of the pitman from the wrist pin when desired, for preventing entrance of grit and the like into the wrist pin bearing, and for retaining lubricating oil for this bearing, or grease if preferred. The pivot means 16—17 and 18—19 may be lubricated with heavy grease and the wear upon them will be negligible due to the fact that both sockets 16—18 open downwardly and hence cannot accumulate sand and the like.

No broad claim is herein made to the shoulder 32, the packing 33, the sleeve 25 and the means for inwardly forcing this sleeve to compress the packing, in view of the claims in my prior U. S. application Serial No. 265,636, filed March 29, 1928, Patent Number 1,758,357, dated May 13, 1930.

I claim:—

1. A pitman bearing assembly comprising a bearing to receive a wrist pin, two elongated yoke sections receiving said bearing therebetween, said yoke sections having spaced arms at their upper ends projecting outwardly and adapted for securing to opposite sides of a pitman, a block received between the portions of said yoke sections at the inner ends of said arms for movement toward and from the other ends of the yoke sections, means for holding said block toward said other ends of said sections, a second block to which said other ends of said sections are secured, and alined means pivotally connecting said bearing with said blocks.

2. A pitman bearing assembly comprising a bearing to receive a wrist pin, two elongated yoke sections receiving said bearing therebetween, said yoke sections having spaced arms at their upper ends projecting outwardly and adapted for securing to opposite sides of a pitman, the portions of said yoke sections at the inner ends of said arms having opposed recesses, a block received in said recesses for movement toward and from the other ends of the yoke sections, means for holding said block toward said other ends of said sections, a second block to which said other ends of said sections are secured, and alined means pivotally connecting said bearing with said blocks.

3. A pitman bearing assembly comprising a bearing to receive a wrist pin, two elongated yoke sections receiving said bearing therebetween, said yoke sections having spaced arms at their upper ends projecting outwardly and adapted for securing to opposite sides of a pitman, the portions of said yoke sections at the inner ends of said arms having opposed recesses, a block received in said recesses for movement toward and from the other ends of the yoke sections, means for holding said block toward said other ends of said sections, the latter being turned inwardly toward each other, a second block secured against the inner sides of said inwardly turned ends of said sections, and alined means pivotally connecting said bearing with said blocks.

4. A structure as specified in claim 2; said yoke sections having openings from said recesses to their outer sides, said holding means consisting of a wedge passing through said openings and abutting the first named block.

5. In a pitman bearing assembly, a wrist pin having a reduced outer end providing it with an outwardly facing shoulder, a bushing sleeve surrounding said wrist pin and at one end projecting beyond said shoulder, a packing ring around the wrist pin abutting the other end of said sleeve, a thrust ring around the reduced end of said wrist pin and abutting said one end of said sleeve, a collar of less external diameter than said thrust ring and abutting the outer side of the latter, said collar being secured on said reduced end of the wrist pin, a bearing body containing all of the aforesaid parts and having a shoulder abutting the outer side of said packing ring, and thrust means abutting the outer side of said thrust ring and adjustable from the exterior of said body to inwardly thrust said thrust ring and said sleeve for the purpose of compressing said packing ring, said thrust ring also co-acting with said collar in holding the entire bearing against sliding from the wrist pin.

6. In a pitman bearing assembly, a wrist pin having a reduced outer end providing it with an outwardly facing shoulder, a bushing sleeve surrounding said wrist pin and at one end projecting beyond said shoulder, a packing ring around the wrist pin abutting the other end of said sleeve, a thrust ring around the reduced end of said wrist pin and abutting said one end of said sleeve, a collar of less external diameter than said thrust ring and abutting the outer side of the latter, said collar being secured on said reduced end of the wrist pin, a thrust cap receiving the outer end of the wrist pin and said collar, said thrust cap abutting the outer side of said thrust ring, a bearing body containing all of the aforesaid parts and having a shoulder abutting the outer side of said packing ring, and a thrust device passing through the outer end of said body and abutting said thrust cap to inwardly force said thrust cap, thrust ring and sleeve to compress said packing ring, said thrust ring also co-acting with said collar in holding the entire bearing against sliding from the wrist pin.

7. In a pitman bearing assembly, a wrist pin having a free end provided with a continuous shoulder facing toward its other end, a thrust ring around the pin, said ring abutting said shoulder and projecting radially beyond the same, a bushing sleeve surrounding said pin and having one end abutting the projecting portion of said ring, a packing ring around said pin abutting the other end of said bushing sleeve, a bearing shell around the aforesaid parts and having a shoulder abutting said packing ring, said shell slidably engaging said bushing sleeve, and adjusting means abutting said thrust ring and adjustable from the exterior of said shell, said adjusting means being operative to force said bushing sleeve toward said shoulder of said shell to compress said packing.

In testimony whereof I have hereunto affixed my signature.

ORSON W. DUNHAM.